(12) United States Patent
Tseng et al.

(10) Patent No.: US 11,933,996 B2
(45) Date of Patent: Mar. 19, 2024

(54) COMPOUND PRISM MODULE AND IMAGE ACQUISITION MODULE

(71) Applicant: GUANGZHOU LUXVISIONS INNOVATION TECHNOLOGY LIMITED, Guangzhou (CN)

(72) Inventors: Cheng-Te Tseng, Guangzhou (CN); Yu-Yan Su, Guangzhou (CN); Ting-Cheng Lee, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 25 days.

(21) Appl. No.: 17/688,165

(22) Filed: Mar. 7, 2022

(65) Prior Publication Data
US 2022/0187513 A1    Jun. 16, 2022

(30) Foreign Application Priority Data
Apr. 21, 2021 (CN) .......................... 202110429869.8

(51) Int. Cl.
*G02B 5/04* (2006.01)
*G02B 7/18* (2021.01)
*G03B 37/04* (2021.01)

(52) U.S. Cl.
CPC ........... *G02B 5/045* (2013.01); *G02B 7/1805* (2013.01); *G03B 37/04* (2013.01)

(58) Field of Classification Search
CPC ....... G02B 5/045; G02B 7/1805; G03B 37/04
USPC ................................................. 359/833, 834
See application file for complete search history.

(56) References Cited

U.S. PATENT DOCUMENTS

| 2,317,988 | A | * | 5/1943 | Forssberg | ................. G02B 5/04 359/834 |
| 2,406,798 | A | * | 9/1946 | Burroughs | ................. G01S 1/02 342/429 |
| 2,447,828 | A | * | 8/1948 | West | ..................... G02B 27/283 359/833 |
| 3,597,702 | A | * | 8/1971 | Dumanchin | ............ H01S 3/081 372/100 |

(Continued)

FOREIGN PATENT DOCUMENTS

| CN | 102012627 | * | 9/2011 |
| CN | 209895095 | * | 1/2020 |

*Primary Examiner* — Ricky D Shafer
(74) *Attorney, Agent, or Firm* — Birch, Stewart, Kolasch & Birch, LLP

(57) ABSTRACT

A compound prism module is provided, including: a first prism, a second prism, and an interface filling medium. The first prism has a first light-incident surface, a first reflecting surface, and a first light-emitting surface, where the first light-incident surface and the first light-emitting surface are connected to a first side edge, and the first light-incident surface and the first reflecting surface are connected to a first chamfered plane. The second prism has a second light-incident surface, a second reflecting surface, and a second light-emitting surface, wherein the second light-incident surface and the second light-emitting surface are connected to a second side edge, and the second light-incident surface and the second reflecting surface are connected to a second chamfered plane. The first light-incident surface and the second light-incident surface are connected to each other, and the first side edge and the second side edge are parallel to each other.

18 Claims, 10 Drawing Sheets

(56) References Cited

U.S. PATENT DOCUMENTS

| | | | | |
|---|---|---|---|---|
| 4,709,144 A * | 11/1987 | Vincent | ............... | G01J 3/2803 |
| | | | | 250/226 |
| 5,521,759 A * | 5/1996 | Dobrowolski | ......... | G02B 1/115 |
| | | | | 359/590 |
| 7,701,653 B2 * | 4/2010 | Baumann | ............. | F41G 7/2253 |
| | | | | 359/837 |
| 8,139,125 B2 * | 3/2012 | Scherling | .............. | H04N 23/55 |
| | | | | 348/335 |
| 9,374,516 B2 * | 6/2016 | Osborne | .................. | G02B 7/09 |
| 9,549,107 B2 * | 1/2017 | Georgiev | ............... | H04N 23/45 |
| 2005/0200965 A1 * | 9/2005 | Staley, III | ............. | G02B 27/32 |
| | | | | 359/634 |
| 2014/0111607 A1 * | 4/2014 | Scherling | ............ | H04N 5/2624 |
| | | | | 348/36 |
| 2021/0185226 A1 * | 6/2021 | Yen | ...................... | G01J 3/2823 |
| 2022/0187512 A1 * | 6/2022 | Tseng | .................. | G02B 27/106 |

* cited by examiner

COMPOUND PRISM MODULE AND IMAGE ACQUISITION MODULE

CROSS-REFERENCE TO RELATED APPLICATION

This non-provisional application claims priority under 35 U.S.C. § 119(a) to Patent Application No. 202110429869.8 filed in China on Apr. 21, 2021, the entire contents of which are hereby incorporated by reference.

BACKGROUND

Technical Field

The present disclosure relates to a biprism structure, and in particular, to a compound prism module and an image acquisition module in which the compound prism module is applicable.

Related Art

In cases in which wide-angle photography is required for acquiring images, to avoid image distortion caused by single large field of view image acquisition, a biprism structure is used for image acquisition. Small field of view images are respectively acquired by using two prisms and then spliced into a large field of view image through backend processing.

To reduce the width of the biprism structure, corresponding corners of the two prisms are cut to splice the two prisms, forming a seam between the two prisms. The seam produces interfaces with inconsistent medium refractive indexes when light passes through the seam, resulting in multiple refractions, which leads to flare in acquired images.

SUMMARY

In view of the above problem, the present disclosure provides a compound prism module and an image acquisition module in which the compound prism module is applicable, to avoid the occurrence of flare.

At least one embodiment of the present disclosure provides a compound prism module, including: a first prism, a second prism, and an interface filling medium is applicable. The first prism has a first light-incident surface, a first reflecting surface, and a first light-emitting surface connected to each other, where the first light-incident surface and the first light-emitting surface are connected to a first side edge, and the first light-incident surface and the first reflecting surface are connected to a first chamfered plane. The second prism has a second light-incident surface, a second reflecting surface, and a second light-emitting surface connected to each other, where the second light-incident surface and the second light-emitting surface are connected to a second side edge, and the second light-incident surface and the second reflecting surface are connected to a second chamfered plane.

The first chamfered plane and the second chamfered plane are attached to each other, so that the first light-incident surface and the second light-incident surface are connected to each other and are coplanar, and the first side edge and the second side edge are parallel to each other and far away from each other. The interface filling medium is filled between the first chamfered plane and the second chamfered plane.

In at least one embodiment of the present disclosure, the interface filling medium is an optical adhesive.

In at least one embodiment of the present disclosure, the interface filling medium is light-proof ink.

In at least one embodiment of the present disclosure, the first reflecting surface and the second reflecting surface are provided with reflective coatings.

In at least one embodiment of the present disclosure, a first angle exists between the first light-incident surface and the first reflecting surface, a second angle exists between the second light-incident surface and the second reflecting surface, a third angle exists between the first reflecting surface and the second reflecting surface, and a sum of the first angle, the second angle, and the third angle is 180 degrees.

In at least one embodiment of the present disclosure, the compound prism module further includes a prism holder. The prism holder has a bottom surface and a first inclined side surface and a second inclined side surface extending from two opposite side edges of the bottom surface, where the first reflecting surface is fixed to the first inclined side surface, and the second reflecting surface is fixed to the second inclined side surface.

In at least one embodiment of the present disclosure, the compound prism module further includes an optical adhesive. The optical adhesive bonds the first reflecting surface with the first inclined side surface and bonds the second reflecting surface with the second inclined side surface.

In at least one embodiment of the present disclosure, the first inclined side surface and the second inclined side surface are provided with reflective coatings.

In at least one embodiment of the present disclosure, the angle between the first reflecting surface and the second reflecting surface is equal to an angle between the first inclined side surface and the second inclined side surface.

In at least one embodiment of the present disclosure, a rigidity coefficient of the prism holder is greater than rigidity coefficients of the first prism and the second prism.

In at least one embodiment of the present disclosure, the prism holder is a reflecting prism made of glass, and the first prism and the second prism are plastic prisms.

In at least one embodiment of the present disclosure, the compound prism module further includes a lens holder. The lens holder has a bottom plate and a vertical plate, where the vertical plate vertically extends from the bottom plate. The vertical plate is disposed on the bottom surface of the prism holder, so that the first inclined side surface and the second inclined side surface are perpendicular to the bottom plate. The first prism and the second prism are disposed on the bottom plate, so that the first light-incident surface and the second light-incident surface are perpendicular to the bottom plate. The first reflecting surface and the second reflecting surface are combined with the prism holder.

At least one embodiment of the present disclosure further provides an image acquisition module, including the compound prism module described above and two image cameras. The two image cameras are directly or indirectly fixed to the first prism and the second prism and respectively face the first light-emitting surface and the second light-emitting surface for image acquisition.

At least one embodiment of the present disclosure further provides an image acquisition module, including the compound prism module described above and two image cameras. The two image cameras are fixed to the lens holder and respectively face the first light-emitting surface and the second light-emitting surface for image acquisition.

In at least one embodiment of the present disclosure, the lens holder further includes two holders extending from the bottom plate or the vertical plate and respectively corresponding to the first light-incident surface and the second light-incident surface. The two image cameras are respectively fixed to the holders.

In the present disclosure, two spliced prisms are replaced with an integrally formed biprism structure, thereby avoiding the problem of flare at a splicing position. In addition, in at least one embodiment of the present disclosure, the prism holder made of a material with a higher rigidity coefficient is added, thereby avoiding deformation of the biprism structure and maintaining the flatness of the light-incident surfaces. Therefore, the biprism structure may be made of optical plastics with lower costs, thereby effectively reducing production costs.

DETAILED DESCRIPTION

Figure 1:
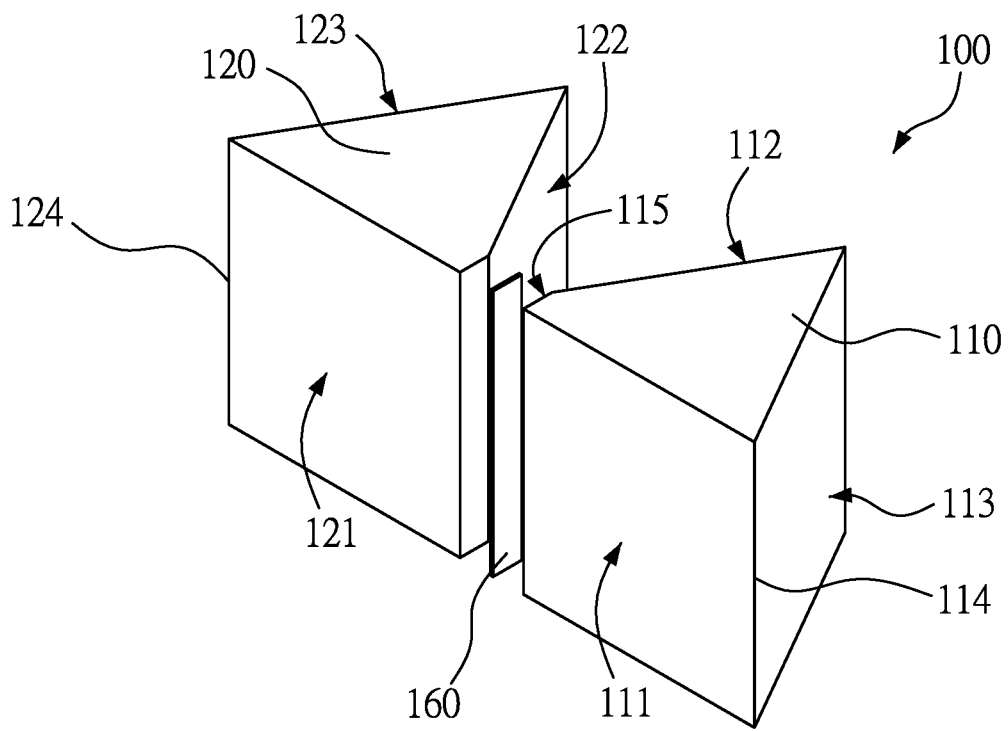
FIG. 1 is a three-dimensional exploded view of a first prism, a second prism, and an interface filling medium according to an embodiment of the present disclosure.
Figure 2:
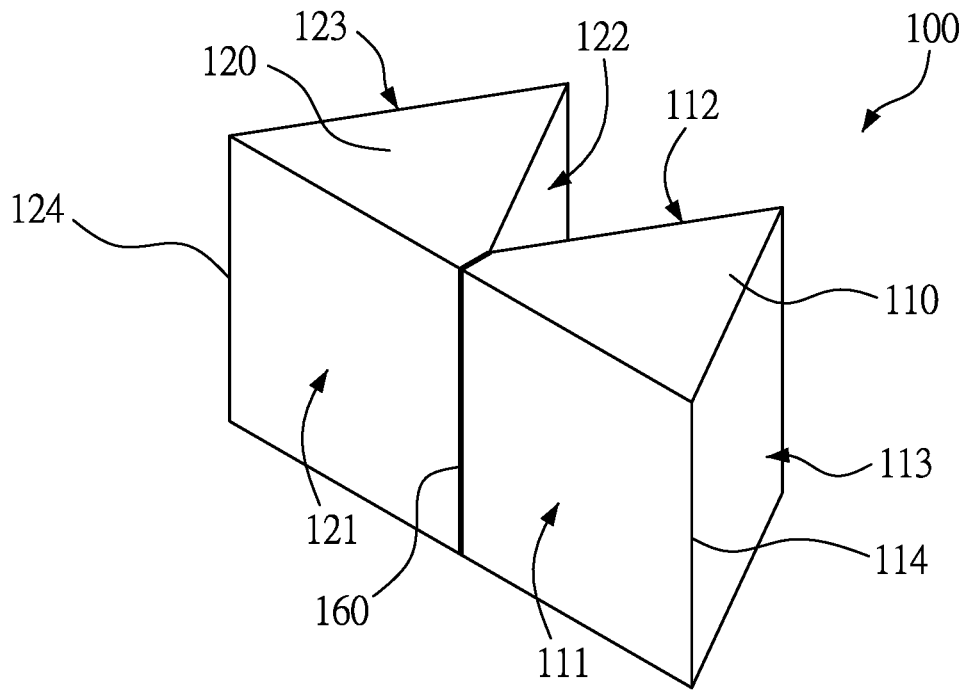
FIG. 2 is a three-dimensional view of the first prism, the second prism, and the interface filling medium according to an embodiment of the present disclosure.
Figure 3:
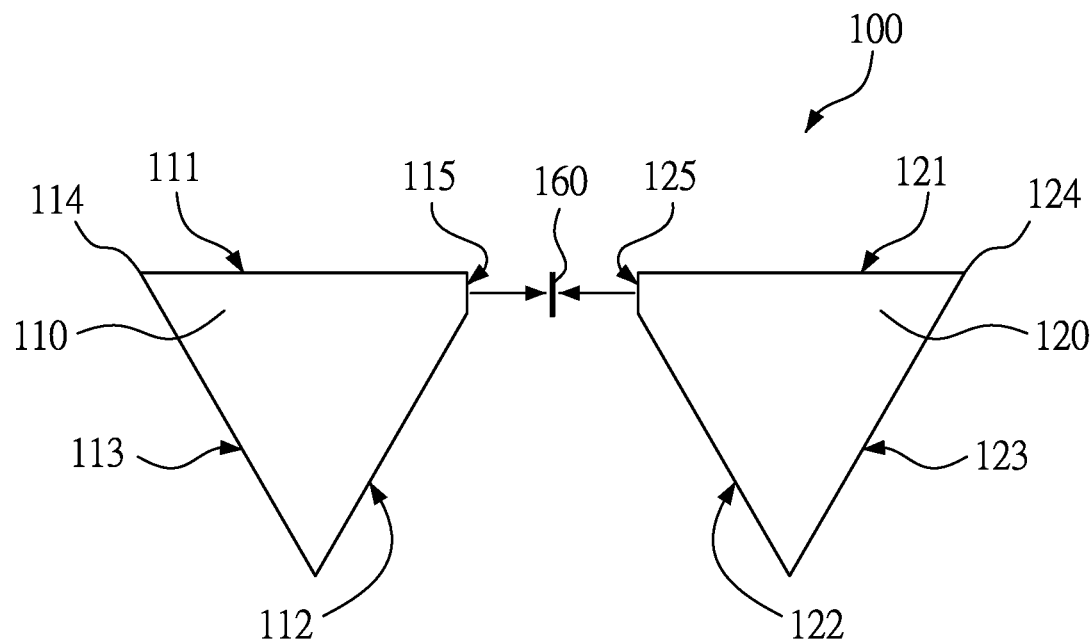
FIG. 3 is a top exploded view of the first prism, the second prism, and the interface filling medium according to an embodiment of the present disclosure.

FIG. 1, FIG. 2, FIG. 3, and FIG. 4 show a compound prism module 100 disclosed in the embodiments of the present disclosure. The compound prism module 100 is used for large field of view image acquisition, to acquire two spliceable images to form a large field of view image. The compound prism module 100 includes a first prism 110, a second prism 120, and an interface filling medium 160.

As shown in FIG. 1, FIG. 2, FIG. 3, and FIG. 4, the first prism 110 has a first light-incident surface 111, a first reflecting surface 112, and a first light-emitting surface 113 connected to each other. The first light-incident surface 111 and the first light-emitting surface 113 are connected to a first side edge 114. The first light-incident surface 111 and the first reflecting surface 112 are connected to a first chamfered plane 115. The second prism 120 has a second light-incident surface 121, a second reflecting surface 122, and a second light-emitting surface 123 connected to each other. The second light-incident surface 121 and the second light-emitting surface 123 are connected to a second side edge 124. The second light-incident surface 121 and the second reflecting surface 122 are connected to a second chamfered plane 125.

As shown in FIG. 1, FIG. 2, FIG. 3, and FIG. 4, the first chamfered plane 115 and the second chamfered plane 125 are attached to each other, so that the first light-incident surface 111 and the second light-incident surface 121 are connected to each other and are coplanar. The first reflecting surface 112 and the second reflecting surface 122 are connected to each other through the first light-incident surface 111 and the second light-incident surface 121. The first side edge 114 and the second side edge 124 are parallel to each other and far away from each other. In a specific embodiment, the first reflecting surface 112 and the second reflecting surface 122 are provided with reflective coatings to strengthen the reflection effect of the first reflecting surface 112 and the second reflecting surface 122 to avoid light penetration. The interface filling medium 160 is filled between the first chamfered plane 115 and the second chamfered plane 125 to fill a seam at which the first chamfered plane 115 and the second chamfered plane 125 are not firmly joined. That is, the first prism 110 and the second prism 120 are combined together through the combination of the interface filling medium 160 to form the compound prism module 100 having a biprism structure.

Figure 5:
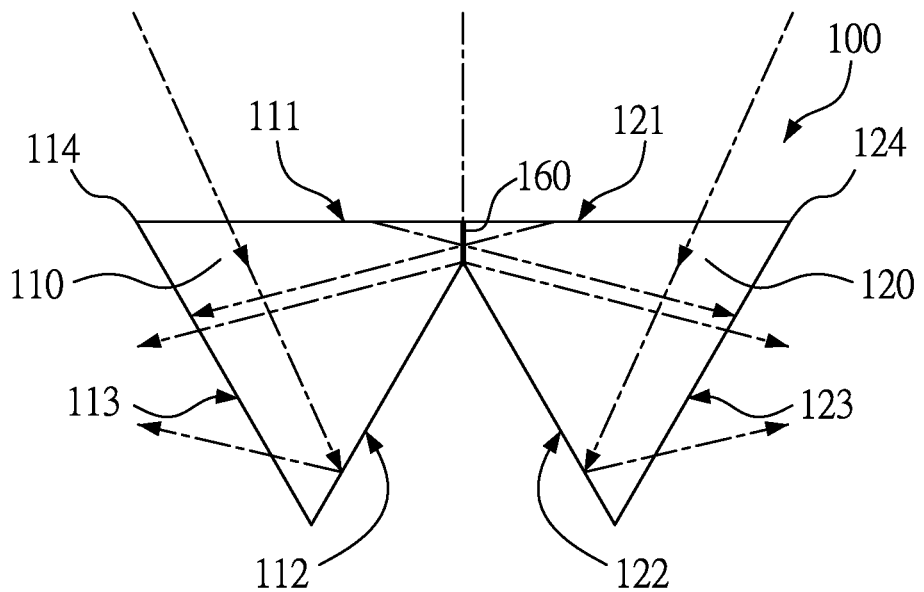
FIG. 5 is a schematic diagram in which light travels in the first prism and the second prism according to an embodiment of the present disclosure.

As shown in FIG. 5, in a specific embodiment, the interface filling medium 160 is an optical adhesive 170, and a refractive index of the optical adhesive 170 after curing is close to that of the first prism 110 and the second prism 120. The first chamfered plane 115 and the second chamfered plane 125 are connected by using the optical adhesive 170, thereby eliminating interfaces with inconsistent medium refractive indexes and avoiding the problem of flare in acquired images caused by multiple refractions.

Figure 6:
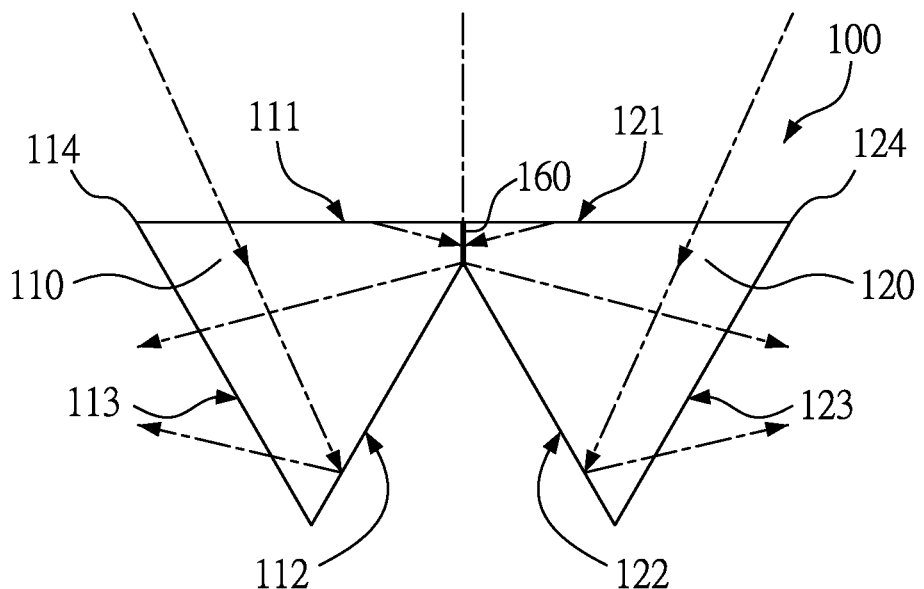
FIG. 6 is a schematic diagram in which light travels in the first prism and the second prism according to another embodiment of the present disclosure.

As shown in FIG. 6, in different embodiments, the interface filling medium 160 is light-proof ink, which blocks light passing through the first chamfered plane 115 and the second chamfered plane 125 and also can eliminate flare. It should be noted that, in FIG. 5 and FIG. 6, refraction of light in and out of the first prism 110 and the second prism 120 is omitted to clearly present the interface filling medium 160, which does not mean that no refraction occurs.

Figure 4:
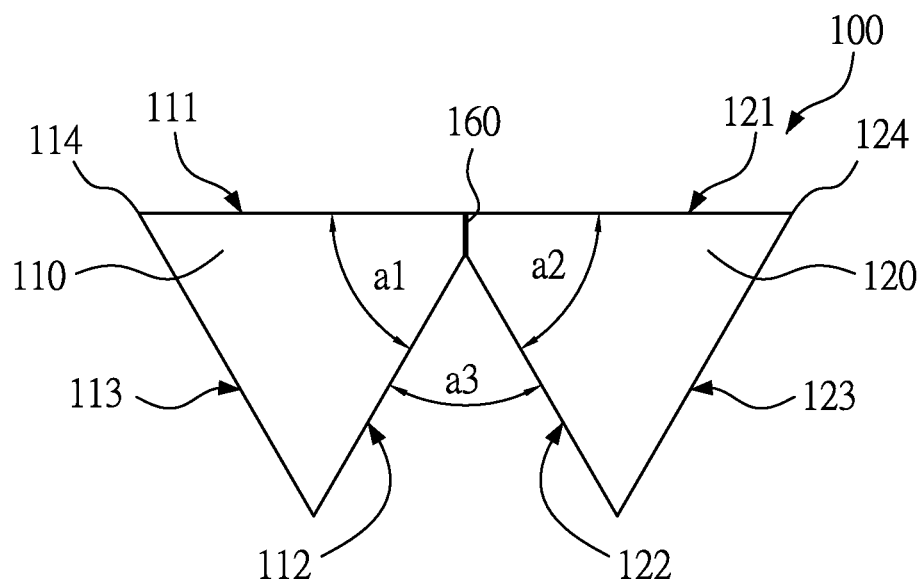
FIG. 4 is a top view of the first prism, the second prism, and the interface filling medium according to an embodiment of the present disclosure.

In addition, as shown in FIG. 4, a first angle a1 exists between the first light-incident surface 111 and the first reflecting surface 112, a second angle a2 exists between the second light-incident surface 121 and the second reflecting surface 122, a third angle a3 exists between the first reflecting surface 112 and the second reflecting surface 122, and a sum of the first angle a2, the second angle a2, and the third angle a3 is 180 degrees.

Figure 7:
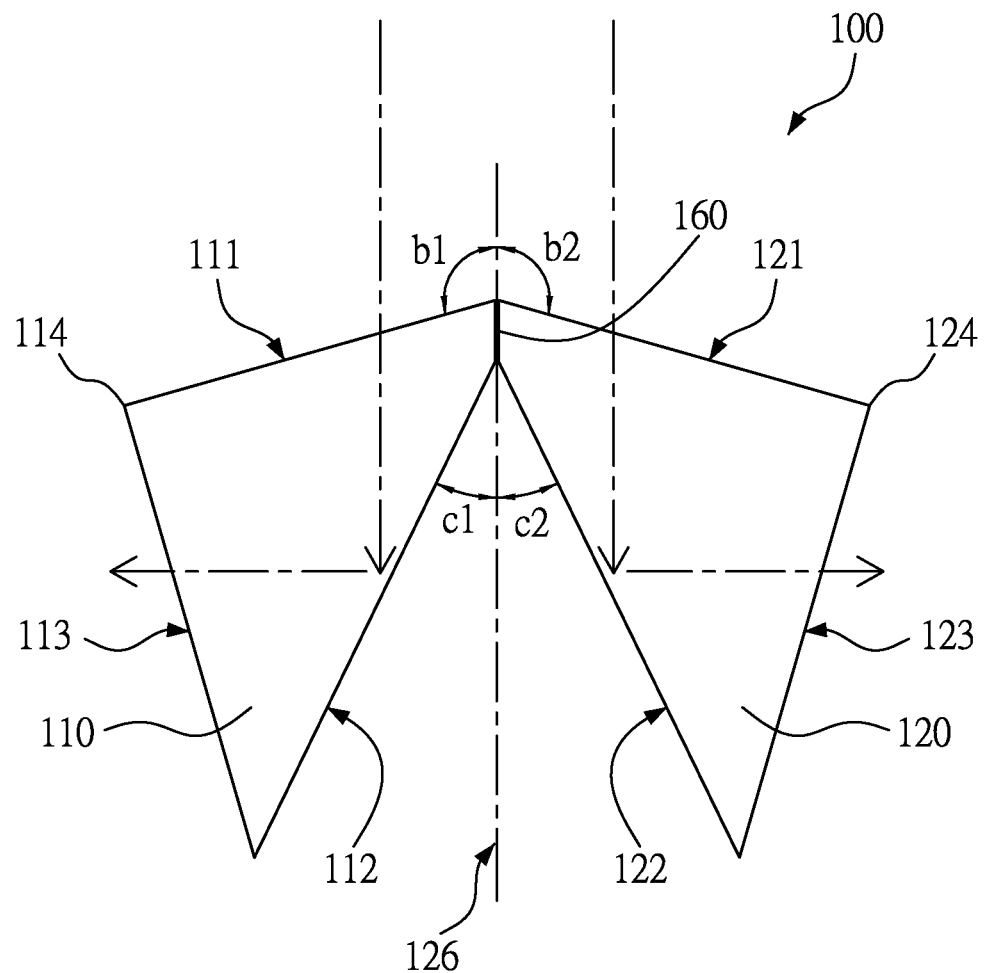
FIG. 7 is a top view of the first prism, the second prism, and the interface filling medium according to another embodiment of the present disclosure.

In a specific embodiment, the first light-incident surface 111 and the second light-incident surface 121 are connected to each other and are not coplanar. As shown in FIG. 7, an interface 126 exists between the first prism 110 and the second prism 120, a fourth angle b1 exists between the first light-incident surface 111 and the interface 126, a fifth angle b2 exists between the second light-incident surface 121 and the interface 126, a sixth angle c1 exists between the first reflecting surface 112 and the interface 126, and a seventh angle c2 exists between the second reflecting surface 122 and the interface 126. In this way, a reflection path of light can be changed according to requirements by adjusting the fourth angle b1 and the fifth angle b2. To ensure the symmetry and equality in subsequent image adjustment of a formed image, the fourth angle b1 may be set equal to the fifth angle b2, and the sixth angle c1 may be set equal to the seventh angle c2.

Figure 8:
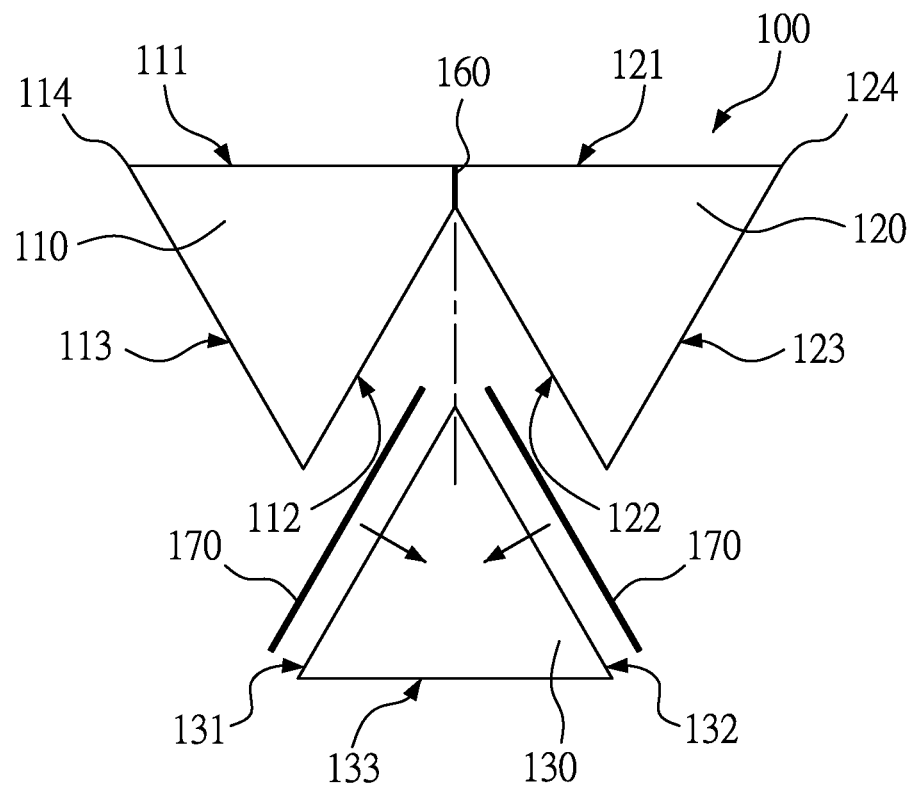
FIG. 8 is a top exploded view of the first prism, the second prism, the interface filling medium, and a prism holder according to an embodiment of the present disclosure.
Figure 9:
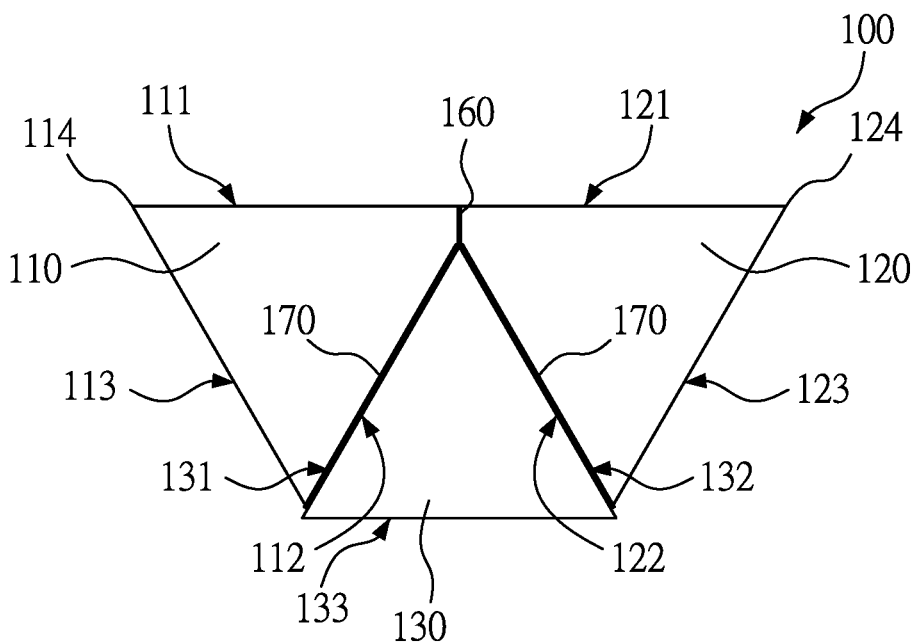
FIG. 9 is a top view of the first prism, the second prism, the interface filling medium, and the prism holder according to an embodiment of the present disclosure.

As shown in FIG. 8 and FIG. 9, to maintain the first light-incident surface 111 and the second light-incident surface 121 coplanar without warpage deformation of the plane, or to stably maintain the first reflecting surface 112 and the second reflecting surface 122 at a specific angle, the compound prism module 100 in the embodiments of the present disclosure may further include a prism holder 130. The prism holder 130 has a bottom surface 133, and a first inclined side surface 131 and a second inclined side surface 132 extending from two opposite side edges of the bottom surface 133. The first reflecting surface 112 is fixed to the first inclined side surface 131, and the second reflecting surface 122 is fixed to the second inclined side surface 132.

As shown in FIG. 8 and FIG. 9, the third angle a3 between the first reflecting surface 112 and the second reflecting surface 122 is equal to an angle between the first inclined side surface 131 and the second inclined side surface 132. By respectively combining the first reflecting surface 112 and the second reflecting surface 122 with the first inclined side surface 131 and the second inclined side surface 132, the third angle a3 may be maintained at a fixed angle through the prism holder 130, so that the first light-incident surface 111 and the second light-incident surface 121 are maintained coplanar. In an embodiment, the sixth angle c1 and the seventh angle c2 may also be maintained at fixed angles through the prism holder 130, so that the first light-incident surface 111 and the second light-incident surface 121 are maintained not coplanar.

Therefore, in terms of configuration of material properties, the rigidity coefficient of the prism holder 130 may be configured to be greater than the rigidity coefficients of the first prism 110 and the second prism 120. For example, the prism holder 130 is a reflecting prism made of glass, and the first prism 110 and the second prism 120 are plastic prisms, thereby reducing production costs of the first prism 110 and the second prism 120 and maintaining the form of the biprism structure by using the prism holder 130. The plastic material may be, but is not limited to, optical plastics with low material costs and easy to process, such as polymethyl methacrylate (PMMA, namely acrylics), polystyrene (PS), or polycarbonate (PC).

As shown in FIG. 8 and FIG. 9, the first prism 110, and the second prism 120 may be bonded with the prism holder 130 by using the optical adhesive 170. The optical adhesive 170 bonds the first reflecting surface 112 with the first inclined side surface 131 and bonds the second reflecting surface 122 with the second inclined side surface 132, to fix the first prism 110 and the second prism 120 to the prism holder 130. In a case that the first prism 110 and the second prism 120 are plastic prisms, and the prism holder 130 is a reflecting prism made of glass, surfaces of the first reflecting surface 112 and the second reflecting surface 122 may be rough, which affects the reflection effect. The rough parts can be filled through bonding of the optical adhesive 170. In addition, in the embodiments that the reflective coatings provided on the first reflecting surface 112 and the second reflecting surface 122 may be alternatively omitted. Instead, the first inclined side surface 131 and the second inclined side surface 132 are provided with reflective coatings, to form a relatively flat reflecting surface.

Figure 10:
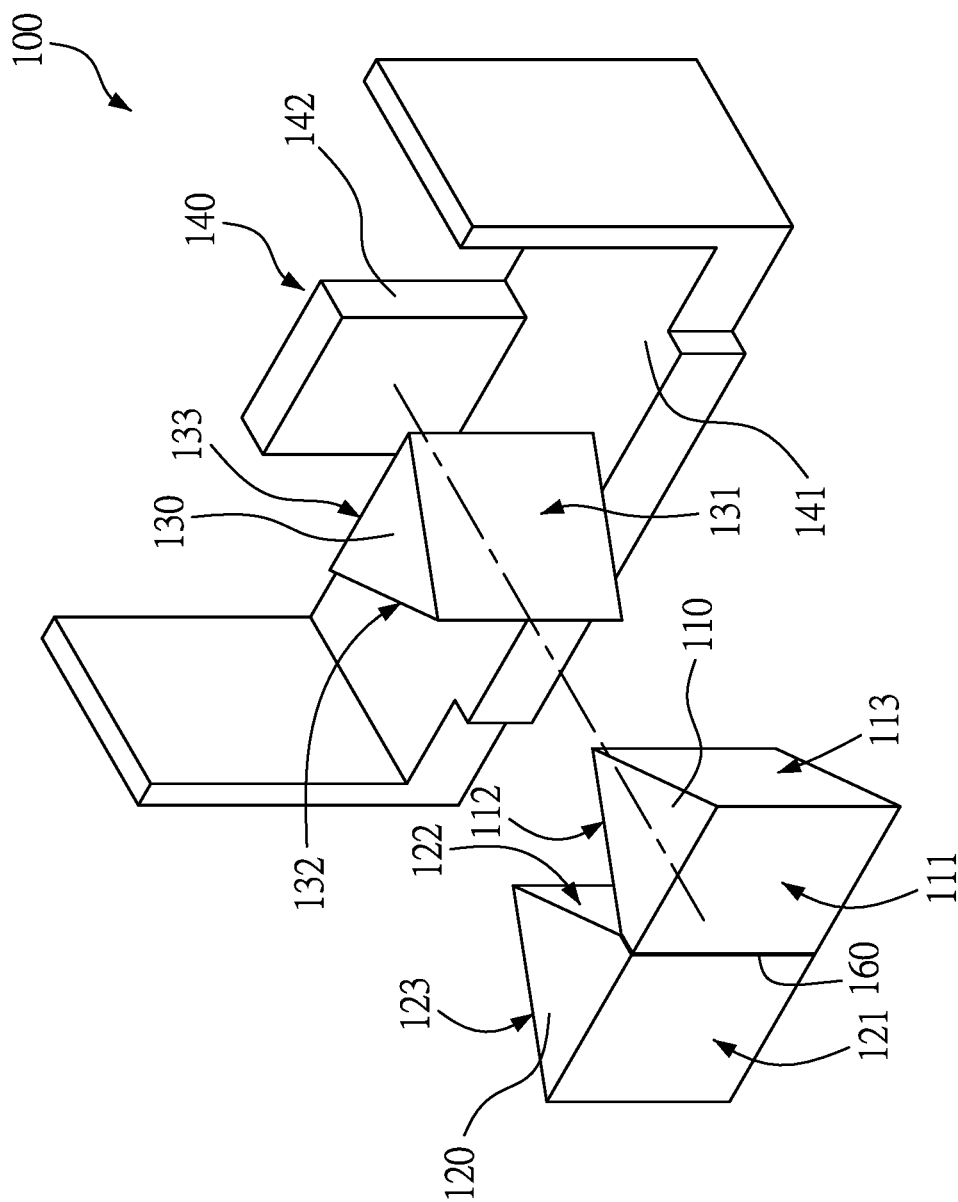
FIG. 10 is a three-dimensional exploded view of the first prism, the second prism, the interface filling medium, the prism holder, and a lens holder according to an embodiment of the present disclosure.
Figure 11:
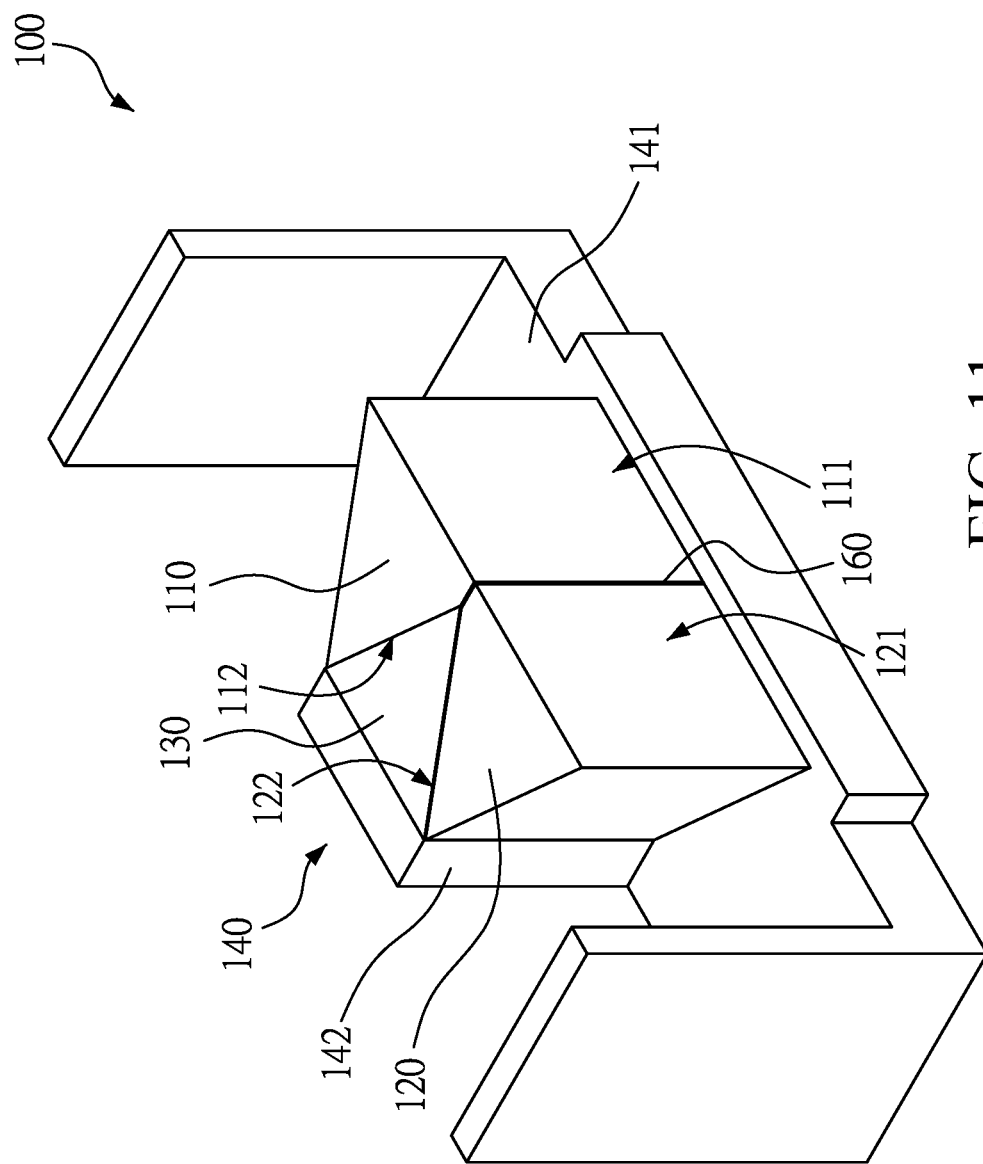
FIG. 11 is a three-dimensional view of the first prism, the second prism, the interface filling medium, the prism holder, and the lens holder according to an embodiment of the present disclosure.

As shown in FIG. 10 and FIG. 11, the compound prism module 100 in the embodiments of the present disclosure may further include a lens holder 140. The lens holder 140 has a bottom plate 141 and a vertical plate 142. The vertical plate 142 vertically extends from the bottom plate 141. The vertical plate 142 is disposed on the bottom surface 133 of the prism holder 130, so that the first inclined side surface 131 and the second inclined side surface 132 are perpendicular to the bottom plate 141. The first prism 110 and the second prism 120 are disposed on the bottom plate 141, so that the first light-incident surface 111 and the second light-incident surface 121 are perpendicular to the bottom plate 141, and the first reflecting surface 112 and the second reflecting surface 122 are combined with the prism holder 130.

Figure 12:
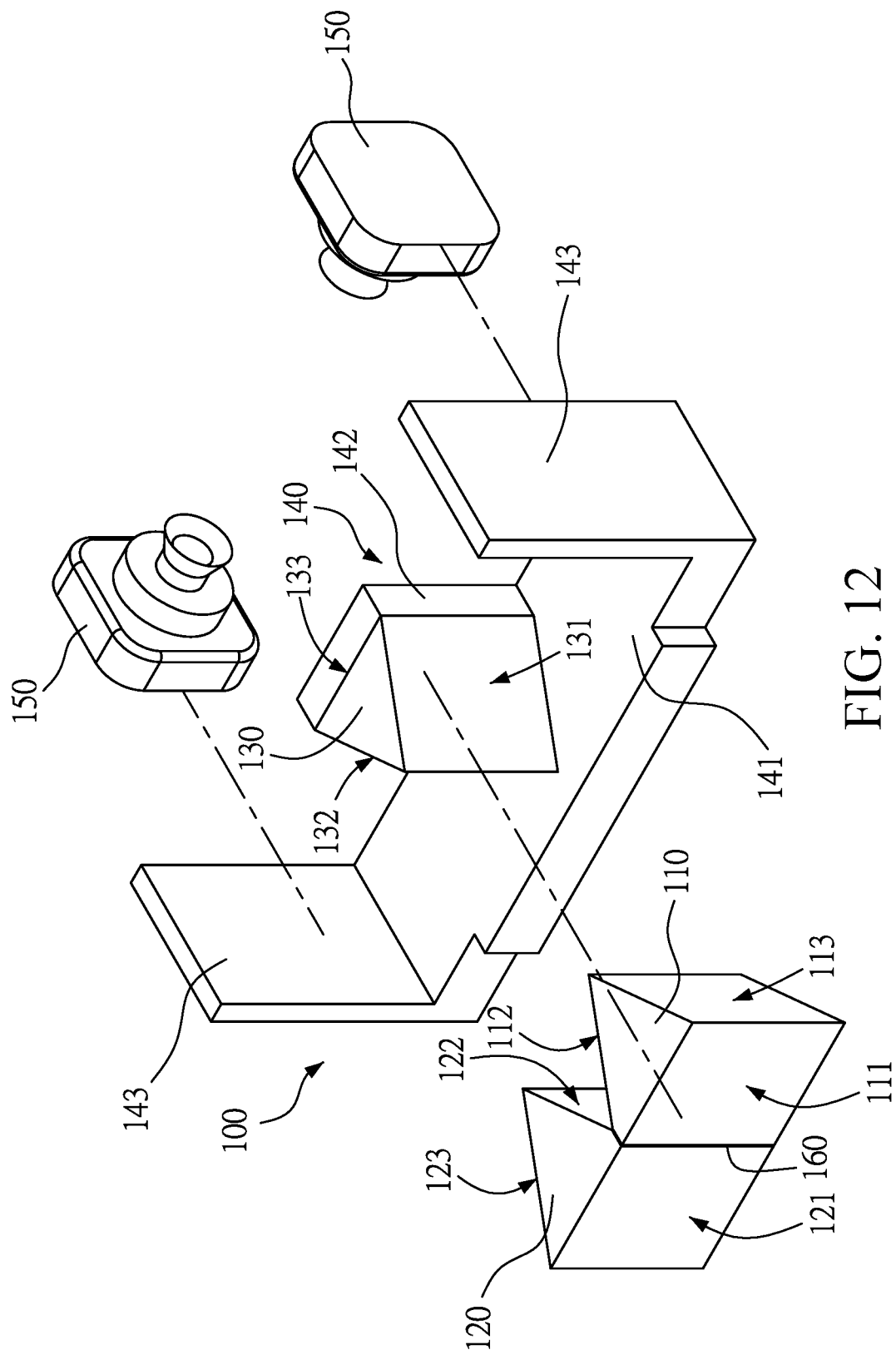
FIG. 12 is a three-dimensional exploded view of an image acquisition module according to an embodiment of the present disclosure.
Figure 13:
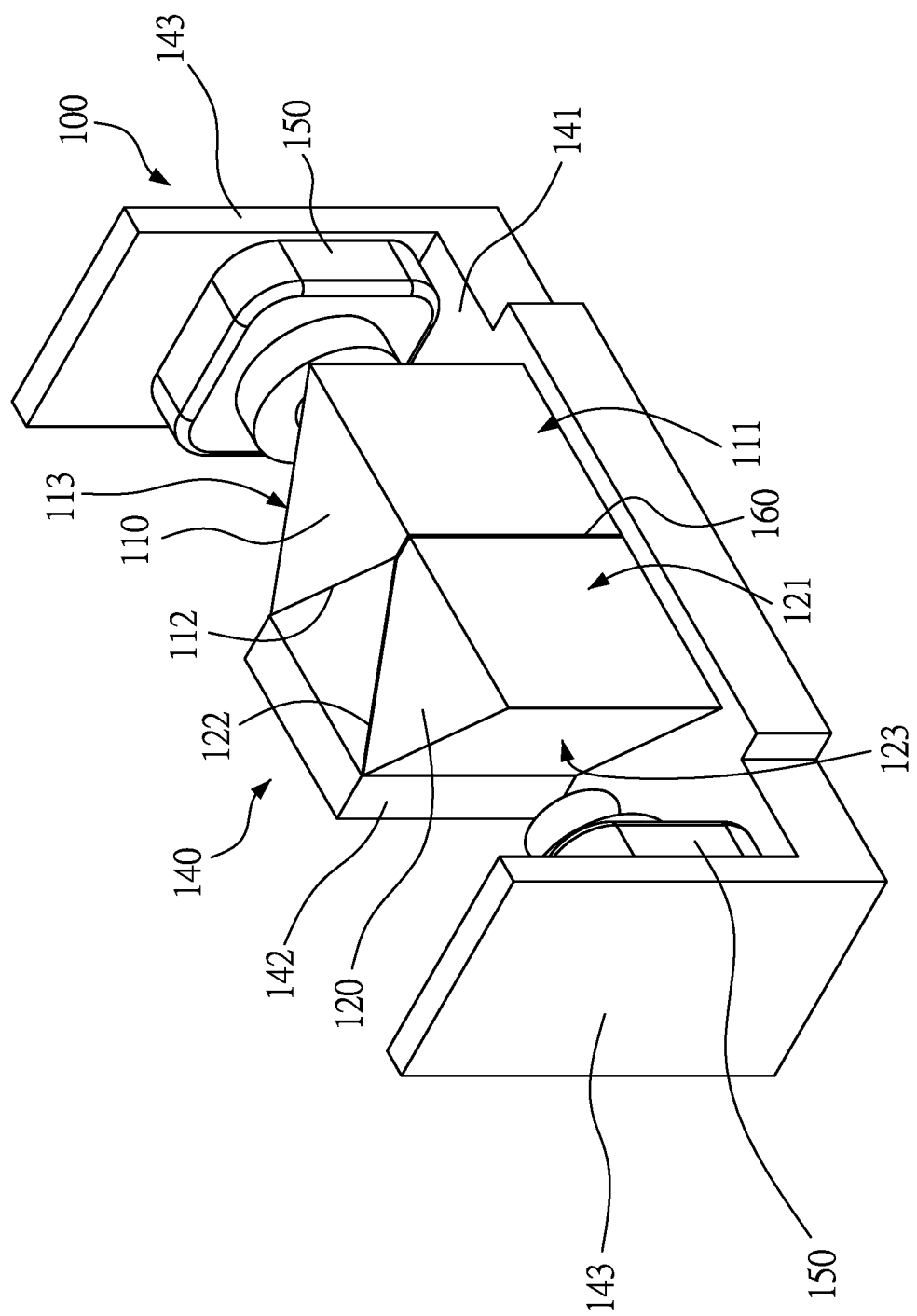
FIG. 13 is a three-dimensional view of the image acquisition module according to an embodiment of the present disclosure.

As shown in FIG. 12 and FIG. 13, based on the compound prism module 100, the embodiments of the present disclosure further provide an image acquisition module including the compound prism module 100 and two image cameras 150. The image cameras 150 are directly or indirectly fixed to the first prism 110 and the second prism 120 and respectively face the first light-emitting surface 113 and the second light-emitting surface 123 for image acquisition. In the embodiments of the present disclosure, the two image cameras 150 are fixed to the lens holder 140 and indirectly fixed to the first prism 110 and the second prism 120. As shown in FIG. 12 and FIG. 13, the lens holder 140 further includes two holders 143 respectively extending from the bottom plate 141. The two image cameras 150 are respectively fixed to the holders 143. In different embodiments, the holders 143 may extend from the vertical plate 142. In different embodiments, each image camera 150 has an extension structure for connecting to the first prism 110 or the second prism 120, so that the two image cameras 150 are directly fixed to the first prism 110 and the second prism 120.

Figure 14:
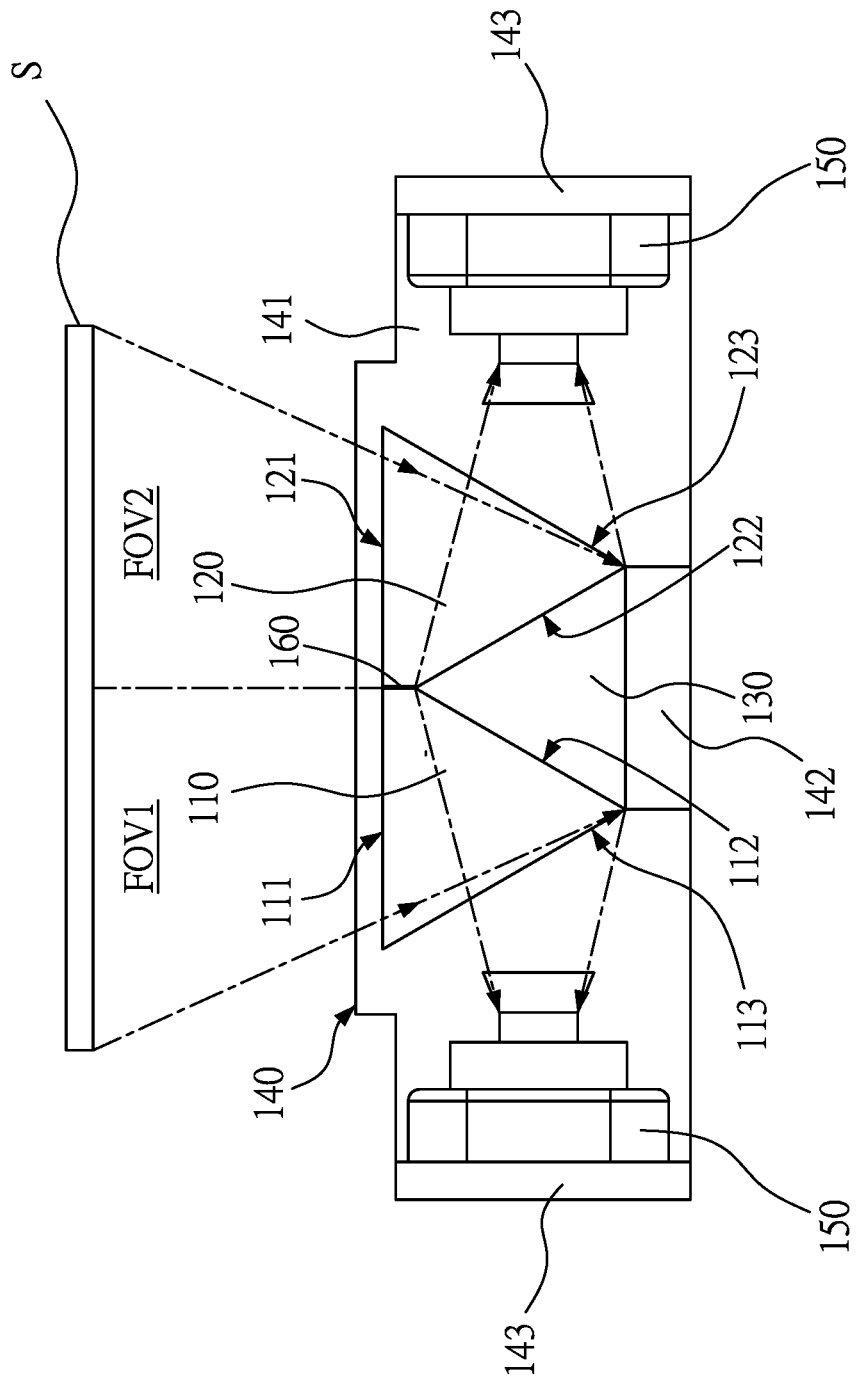
FIG. 14 is a top view of the image acquisition module according to an embodiment of the present disclosure.

Referring to FIG. 14, the first prism 110 and one image camera 150 form a periscope set. The first prism 110 is combined with the image camera 150, so that the first prism 110 has a first field of view FOV1 in front of the first light-incident surface 111. The second prism 120 and the other image camera 150 form another periscope set. The second prism 120 is combined with the image camera 150, so that the second prism 120 has a second field of view FOV2 in front of the second light-incident surface 121. The matching of the two periscope sets can provide a relatively wide-angle equivalent field of view for the compound prism module 100. The equivalent field of view may be equal to FOV1+FOV2, or slightly smaller than FOV1+FOV2. In a case that the equivalent field of view is equal to FOV1+FOV2, the two image cameras 150 respectively acquire images of half a target scene S. The two images may be spliced by a backend data processing circuit into an equivalent image including a complete target scene S. In a case that the equivalent field of view is smaller than FOV1+FOV2, images respectively acquired by the two image cameras 150 are slightly larger than half the target scene S. That is, the images respectively acquired by the two image cameras 150 partially overlap. The two images may be spliced by a backend data processing circuit into an equivalent image including a complete target scene S after the partially overlapping part is cropped.

In the present disclosure, the interface filling medium 160 is filled between the chamfered planes used for splicing the two prisms, thereby avoiding the problem of flare at a splicing position. In addition, in at least one embodiment of the present disclosure, the prism holder 130 made of a material with a higher rigidity coefficient is added, thereby avoiding deformation of the biprism structure and maintaining the flatness of the light-incident surfaces. Therefore, the biprism structure can be made of optical plastics with lower costs, thereby effectively reducing production costs.

What is claimed is:

1. A compound prism module, comprising:
    a first prism, having a first light-incident surface, a first reflecting surface, and a first light-emitting surface connected to each other, wherein the first light-incident surface and the first light-emitting surface are connected to a first side edge, and the first light-incident surface and the first reflecting surface are connected to a first chamfered plane, the first reflecting surface is bonded with an interface filling medium;
    a second prism, having a second light-incident surface, a second reflecting surface, and a second light-emitting surface connected to each other, wherein the second light-incident surface and the second light-emitting surface are connected to a second side edge, and the second light-incident surface and the second reflecting surface are connected to a second chamfered plane, the second reflecting surface is bonded with the interface filling medium, wherein the first chamfered plane and the second chamfered plane are attached to each other, so that the first light-incident surface and the second light-incident surface are connected to each other, and the first side edge and the second side edge are parallel to each other and far away from each other; and
    the interface filling medium, filled between the first chamfered plane and the second chamfered plane;
    wherein the first reflecting surface and the second reflecting surface are provided with reflective coatings to strengthen the reflection effect;
    wherein the interface filling medium is an optical adhesive and a refractive index of the optical adhesive after curing is close to a refractive index of the first prism and a refractive index of the second prism.

2. The compound prism module according to claim 1, wherein the interface filling medium is light-proof ink.

3. The compound prism module according to claim 1, wherein
    a first angle exists between the first light-incident surface and the first reflecting surface, a second angle exists between the second light-incident surface and the second reflecting surface, a third angle exists between the first reflecting surface and the second reflecting surface, and a sum of the first angle, the second angle, and the third angle is 180 degrees.

4. The compound prism module according to claim 1, further comprising:
    a prism holder, having a bottom surface and a first inclined side surface and a second inclined side surface extending from two opposite side edges of the bottom surface, wherein the first reflecting surface is fixed to the first inclined side surface, and the second reflecting surface is fixed to the second inclined side surface.

5. The compound prism module according to claim 4, further comprising an optical adhesive bonding the first reflecting surface with the first inclined side surface and bonding the second reflecting surface with the second inclined side surface.

6. The compound prism module according to claim 4, wherein the first inclined side surface and the second inclined side surface are provided with reflective coatings.

7. The compound prism module according to claim 4, wherein
    the angle between the first reflecting surface and the second reflecting surface is equal to an angle between the first inclined side surface and the second inclined side surface.

8. The compound prism module according to claim 4, wherein
    a rigidity coefficient of the prism holder is greater than rigidity coefficients of the first prism and the second prism.

9. The compound prism module according to claim 8, wherein
    the prism holder is a reflecting prism made of glass, and the first prism and the second prism are plastic prisms.

10. The compound prism module according to claim 4, further comprising a lens holder having a bottom plate and a vertical plate, wherein the vertical plate vertically extends from the bottom plate; the vertical plate is disposed on the bottom surface of the prism holder, so that the first inclined side surface and the second inclined side surface are perpendicular to the bottom plate; the first prism and the second prism are disposed on the bottom plate, so that the first light-incident surface and the second light-incident surface are perpendicular to the bottom plate; and the first reflecting surface and the second reflecting surface are combined with the prism holder.

11. An image acquisition module, comprising:
    the compound prism module according to claim 10; and
    two image cameras, fixed to the lens holder, and respectively facing the first light-emitting surface and the second light-emitting surface for image acquisition.

12. The image acquisition module according to claim 11, wherein the lens holder further comprises two holders extending from the bottom plate or the vertical plate and respectively corresponding to the first light-incident surface and the second light-incident surface; and the two image cameras are respectively fixed to the holders.

13. An image acquisition module, comprising:
    the compound prism module according to claim 1; and
    two image cameras, directly or indirectly fixed to the first prism and the second prism, and respectively facing the first light-emitting surface and the second light-emitting surface for image acquisition.

14. The compound prism module according to claim 13, wherein
    a first angle exists between the first light-incident surface and the first reflecting surface, a second angle exists between the second light-incident surface and the second reflecting surface, a third angle exists between the first reflecting surface and the second reflecting surface, and a sum of the first angle, the second angle, and the third angle is 180 degrees.

15. The compound prism module according to claim 13, further comprising:
    a prism holder, having a bottom surface and a first inclined side surface and a second inclined side surface extending from two opposite side edges of the bottom surface, wherein the first reflecting surface is fixed to the first inclined side surface, and the second reflecting surface is fixed to the second inclined side surface.

16. The compound prism module according to claim 15, further comprising an optical adhesive bonding the first reflecting surface with the first inclined side surface and bonding the second reflecting surface with the second inclined side surface.

17. The compound prism module according to claim 15, wherein
- the angle between the first reflecting surface and the second reflecting surface is equal to an angle between the first inclined side surface and the second inclined side surface.

18. The compound prism module according to claim 15, wherein
- a rigidity coefficient of the prism holder is greater than rigidity coefficients of the first prism and the second prism.

* * * * *